Aug. 21, 1934.  R. E. KIRN ET AL  1,970,892
PISTON RING
Filed March 21, 1932    2 Sheets-Sheet 1
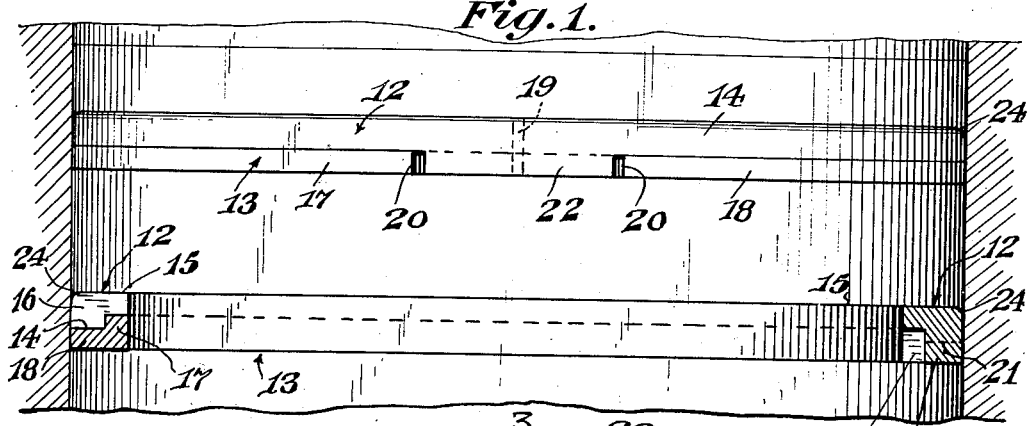
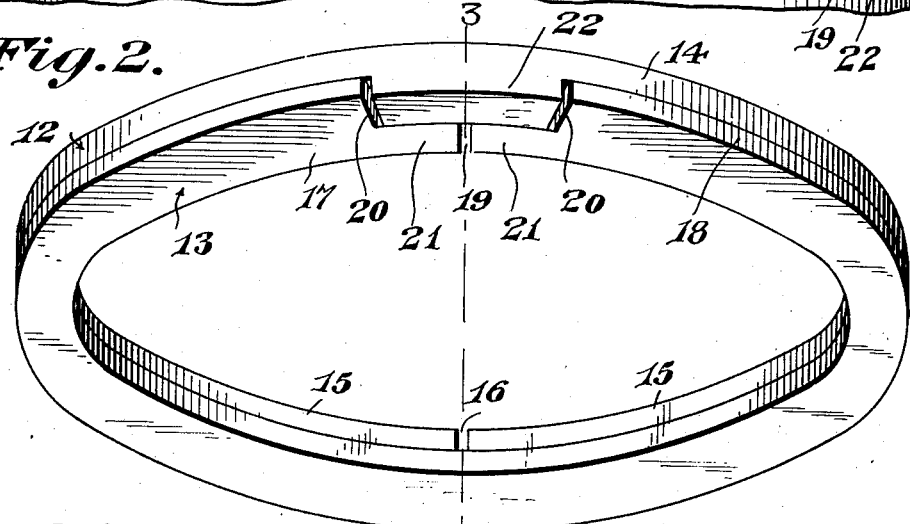
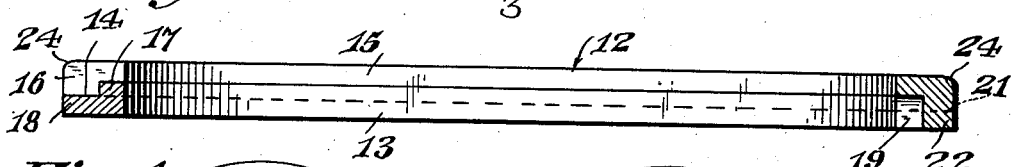
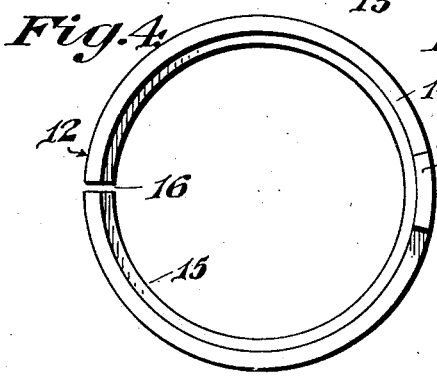
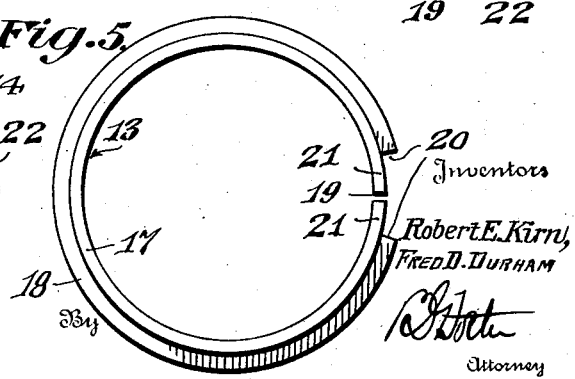

Aug. 21, 1934.    R. E. KIRN ET AL    1,970,892
PISTON RING
Filed March 21, 1932    2 Sheets-Sheet 2
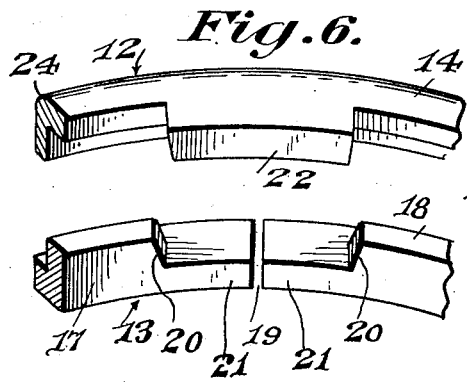
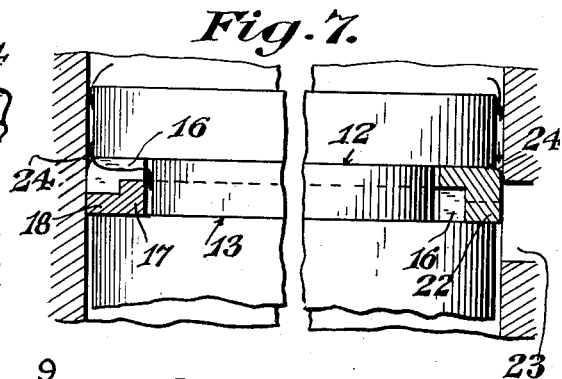
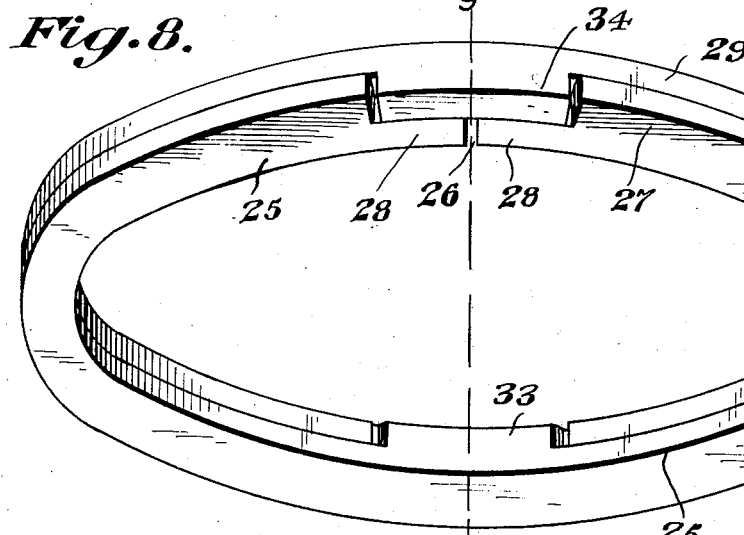
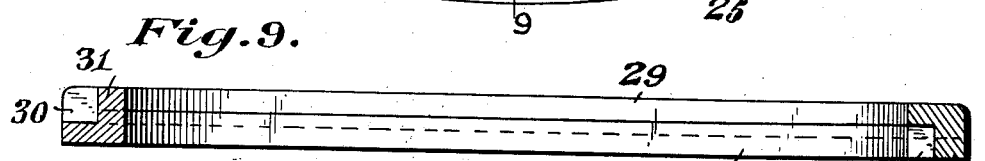
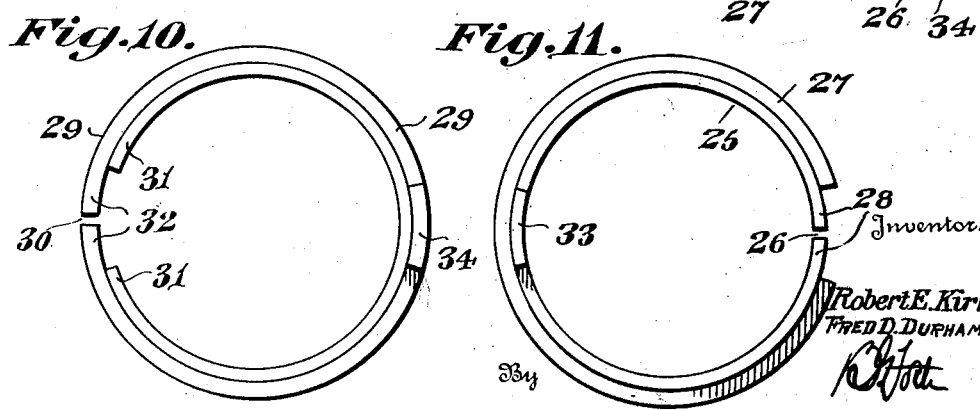
Inventors
Robert E. Kirn,
Fred D. Durham,
By
Attorney Patented Aug. 21, 1934

1,970,892

UNITED STATES PATENT OFFICE 1,970,892

PISTON RING

Robert E. Kirn, New York, N. Y., and Fred D. Durham, Louisville, Ky., assignors to C. Lee Cook Manufacturing Company, Louisville, Ky., a corporation of Kentucky Application March 21, 1932, Serial No. 600,314

1 Claim. (Cl. 309—29)

In a patent numbered 1,741,849 granted on December 31, 1929, there is disclosed a piston ring structure in which the outer or packing ring member has its joint sealed while the joint of the inner ring or expansion member is allowed to remain open for the entrance of fluid under pressure behind the ring, the structure being such that leakage through the outer ring is prohibited and the two members of the ring assembly being so constructed that in cross section they have equal strength and this strength is sufficient to prevent the several members from being bulged outwardly into the cylinder ports.

While the patented structure is ordinarily adequate for that purpose, in the case of a slow-acting machine or where the outer or packing ring member only registers with a cylinder port or when operating under extremely high pressures, it has been found that there is still the possibility of this member or its ends being bulged into said cylinder ports as the ring is not under confinement.

The object of the present invention is to so improve the structure that an effective seal is secured, and at the same time the ends of the ring member that are under compression or are outwardly movable due to the inherent expansive qualities of the ring, are properly held against such movement by the sealing means.

In the accompanying drawings:

Figure 1 is a longitudinal sectional view through a portion of the cylinded showing a piston therein and illustrating two of the packing rings in place.

Figure 2 is a perspective view of one of the packing ring assemblies.

Figure 3 is a sectional view on the line 3—3 of Figure 2.

Figure 4 is a bottom plan view of the outer or packing ring member.

Figure 5 is a top plan view of the inner or expansion ring member.

Figure 6 is a detail perspective view of the joint of the expansion ring and the tongue portion of the packing ring, the parts being separated.

Figure 7 is a detail sectional view illustrating the manner in which the fluid under pressure finds entrance behind the ring and is retained thereby.

Figure 8 is a perspective view of a modified form of construction in which the ring is substantially sealed against the entrance of fluid under pressure behind it.

Figure 9 is a sectional view on the line 9—9 of Figure 8.

Figure 10 is a bottom plan view of the outer or packing ring member of the structure shown in Figures 8 and 9.

Figure 11 is a top plan view of the inner or expansion ring member of the structure shown in Figures 8 and 9.

In the form of construction shown in Figures 1–7 inclusive, an outer or packing ring member 12 and an inner or expansion ring member 13 constitute the assembly. The outer ring member comprises a body 14 having an annular inwardly extending flange 15. The ring is split or provided with a joint shown at 16, the ring being yieldingly expansible as is well understood to those skilled in the art.

The inner or expansion ring member 13 has a body 17, which is located within the body 14 of the outer or packing ring member, and the flange 15 of said outer ring overlies said body 17. This inner ring body 17 has an outstanding annular flange 18 which underlies the body portion 16 of the outer ring member. The inner ring member is also split or has a joint as shown at 19 and the flange 18 is cut away or terminates short of this joint, as shown at 20, thus leaving a recess or seat on opposite sides of the joint 19. In other words, the body portion 17 of the inner or expansion ring is unflanged on opposite sides of the said joint 19.

Located in this seat or against the outer side of the unflanged end portions 21 of the body 17 of the inner ring member is a tongue 22 formed by an extension of the body 14 of the outer ring member, this tongue having a width equal to the width of the flange 18 and a depth also equal to said flange. As clearly shown in Figure 2 the tongue 22 thus bridges the joint 19 of the inner or expansion ring member and constitutes a seal over the otherwise open joint. On the other hand, as shown in Figures 1, 2, 3 and 7 the joint 16 of the outer or packing ring member is open so that when the ring assembly is in place in a piston and the piston is in a cylinder, as exaggeratedly indicated in Figure 7, fluid under pressure acting on the top of the piston can find its way alongside the piston to the joint 16 and enter into the piston groove behind the ring. The other joint 19, however, is completely sealed so that no fluid can pass therethrough. By reference to Figure 7 it will be clear that if the ring should pass across or arrive at an exhaust port, as shown at 23, if the outer ring member is still engaged with the wall of the cylinder, it is positively held against outward movement because it is continuous, and moreover the free ends 21 of the inner ring being bridged by the tongue 22 and the body 17 of this ring member is restrained on body portion 16 of the outer ring member, said inner ring is positively held against expansion and is prevented from bulging into port 23, and thus being injured or broken by contact with the walls thereof.

The pressure of the fluid in the groove back of the ring against the outer or packing ring member 12 is released through joint opening 16 and the groove clearance as this ring registers with a port 23, but as an extra precaution to partially neutralize the outward pressure of the fluid against the outer or packing ring member 12, while said ring is in the process of registering with a port and discharging the said fluid pressure behind the outer ring, the edge or corner of this particular member is preferably beveled or rounded as shown at 24, which gives access to the fluid under pressure to the outer side of the ring member, and thus obviously neutralizes to the extent of exposure of the outer surface an equal area of the inner surface. This is found peculiarly effective in the structure disclosed.

The embodiment shown in Figures 8-11 inclusive is particularly useful where high pressures are employed and it is undesirable to allow such pressures to obtain behind the ring. In this form of structure, both the joints of the inner and outer ring members are completely sealed so that the only fluid which can find access to the inner side of the ring assembly is that which passes through the necessary but very small clearance of the ring assembly in its groove.

In this modified structure the inner ring member is designated 25 and is provided with a cut or joint 26. Said ring member has an outstanding annular flange 27 which terminates at points spaced from the joint 26, leaving the ends 28 unflanged. The outer or packing ring member is designated 29, and has a cut or joint 30. It is provided with an inset annular flange 31, the ends of which terminate at points remote from the ends of the ring body proper, so that the terminal portions 32 of this ring member 29 are unflanged (see Figure 10). The inner ring member 25 is provided at its central portion with a sealing tongue 33 which bridges the joint or cut 30 of the ring 29 and is located between the ends of the flange 31, acting as a complete seal for the joint 30. In like manner the central portion of the ring 29 has a tongue 34 that correspondingly covers the joint 26 and overlies the unflanged ends 28 of the ring 25. Thus, as will be evident by reference particularly to Figures 8 and 9 the open cuts or joints of both members are completely sealed and there is no freely open channel or passageway that gives access of fluid under pressure to the interior of the ring.

What we claim is:

A piston ring assembly including a packing ring member, and an expansion ring member, said expansion ring member comprising a split body having an annular outstanding flange that is on opposite sides of the split, leaving unflanged terminals of the body on opposite sides of the split, said packing ring member having a split body portion extending around the outer side of the expansion ring at one side of the flange thereof and having an offset tongue that extends between the ends of the flange of the expansion ring member the full width of the expansion ring and bridges and seals the cut or joint between the unflanged terminals of the body of the expansion ring member, said expansion ring leaving the joint of the packing ring member unsealed to provide a port for the admission of fluid under pressure behind the piston ring assembly.

ROBERT E. KIRN.
FRED D. DURHAM.